US007984223B2

(12) United States Patent
Nagano et al.

(10) Patent No.: US 7,984,223 B2
(45) Date of Patent: *Jul. 19, 2011

(54) INFORMATION DEVICE INCLUDING MAIN PROCESSING CIRCUIT, INTERFACE CIRCUIT, AND MICROCOMPUTER

(75) Inventors: Hideo Nagano, Tokyo (JP); Kikuo Muramatsu, Tokyo (JP); Masayuki Koyama, Tokyo (JP); Tomoko Ando, Tokyo (JP); Motoki Higashida, Tokyo (JP); Takahiko Arakawa, Tokyo (JP); Makoto Hatakenaka, Tokyo (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/659,545

(22) Filed: Mar. 12, 2010

(65) Prior Publication Data

US 2010/0191883 A1 Jul. 29, 2010

Related U.S. Application Data

(63) Continuation of application No. 11/584,550, filed on Oct. 23, 2006, now Pat. No. 7,716,410.

(30) Foreign Application Priority Data

Oct. 26, 2005 (JP) ................................. 2005-310939

(51) Int. Cl.
*G06F 13/14* (2006.01)
(52) U.S. Cl. ..... 710/305; 709/228; 348/512; 375/240.25
(58) Field of Classification Search ................ 710/1, 62, 710/104, 106, 240, 244; 709/228; 348/512; 375/240.28
See application file for complete search history.

(56) References Cited

U.S. PATENT DOCUMENTS

| 4,313,135 A | 1/1982 | Cooper |
| 4,849,817 A | 7/1989 | Short |
| 5,065,432 A | 11/1991 | Sasaki et al. |
| 5,202,761 A | 4/1993 | Cooper |

(Continued)

FOREIGN PATENT DOCUMENTS

JP 2004-248080 A 9/2004

(Continued)

OTHER PUBLICATIONS

Yao et al. Implementing New HDMI 1.3 Features. HDMI Developers Conference. 2007.*

(Continued)

*Primary Examiner* — Matthew D Spittle
(74) *Attorney, Agent, or Firm* — Buchanan Ingersoll & Rooney PC (57) ABSTRACT

An information device packaged in one package includes a main function unit and an interface function unit. The main function unit includes a main processing circuit for executing signal processing related to a main function in the information device and a first microcomputer for controlling the main processing circuit by executing a first firmware program. The interface function unit includes an interface function unit including a first interface circuit for receiving data from an exterior device located outside of the information device to provide to the main function unit, a second interface circuit for performing an authentication operation with the exterior device, a second microcomputer for controlling the first interface circuit, and a memory for storing a second firmware program for controlling the first interface circuit.

6 Claims, 10 Drawing Sheets

U.S. PATENT DOCUMENTS

| | | |
|---|---|---|
| 5,305,105 A | 4/1994 | Heo |
| 5,502,499 A | 3/1996 | Birch et al. |
| 5,561,307 A | 10/1996 | Mihara et al. |
| 5,606,660 A | 2/1997 | Estakhri et al. |
| 5,668,601 A | 9/1997 | Okada et al. |
| 5,765,995 A | 6/1998 | Springer |
| 5,802,281 A | 9/1998 | Clapp et al. |
| 5,848,155 A | 12/1998 | Cox |
| 6,018,376 A | 1/2000 | Nakatani |
| 6,128,602 A | 10/2000 | Northington et al. |
| 6,266,660 B1 | 7/2001 | Liu et al. |
| 6,744,815 B1 | 6/2004 | Sackstein et al. |
| 6,753,925 B2 | 6/2004 | Limaye |
| 7,047,331 B2 | 5/2006 | Dickens |
| 7,120,168 B2 | 10/2006 | Zimmermann |
| 7,209,992 B2 * | 4/2007 | MacInnis et al. ............. 710/244 |
| 7,212,248 B2 | 5/2007 | Stanger |
| 7,268,900 B1 | 9/2007 | Zimmerman |
| 7,283,175 B2 | 10/2007 | Johnson et al. |
| 7,346,698 B2 | 3/2008 | Hannaway |
| 7,555,570 B2 * | 6/2009 | Hickey et al. .................... 710/8 |
| 2001/0027471 A1 | 10/2001 | Paulose et al. |
| 2005/0186843 A1 | 8/2005 | Tsai |
| 2006/0007356 A1 | 1/2006 | Junkersfeld et al. |

FOREIGN PATENT DOCUMENTS

| | | |
|---|---|---|
| JP | 2005-189587 A | 7/2005 |

OTHER PUBLICATIONS

Lu Xiaozheng. HDMI 1.3 Demystified. Oct. 5, 2006.*
Silicon Image. InstaPort Technology Brief. Revision 1. Jul. 1, 2008.*

* cited by examiner

INFORMATION DEVICE INCLUDING MAIN PROCESSING CIRCUIT, INTERFACE CIRCUIT, AND MICROCOMPUTER

CROSS REFERENCE TO RELATED APPLICATION

This application is a continuation of application Ser. No. 11/584,550, filed on Oct. 23, 2006, which claims priority to Japanese Application No. 2005-310939, filed on Oct. 26, 2005, the specification of which is incorporated herein by reference in its entirety for all purposes.

FIELD OF THE INVENTION

The present invention relates to an information device including a main processing circuit, an interface circuit, and a microcomputer.

DESCRIPTION OF THE BACKGROUND ART

Conventionally, a variety of standards have been proposed for an interface between information devices. For example, HDMI (High-Definition Multimedia Interface) is known as a high-speed serial interface. Devices which adopt the HDMI as an interface are disclosed in Japanese Patent Application Laid-Open No. 2005-189587 and Japanese Patent Application Laid-Open No. 2004-248080. The HDMI is well known as a digital interface which transmits high-quality audio/video (A/V) content data between a source device such as a DVD (Digital Versatile Disk) device, an STB (Set-Top Box) and the like and a sink device such as a plasma display device, a digital television set and the like. The HDMI is characterized by the capability of transmitting encrypted information, the capability of transmitting a video signal and an audio signal at the same time, the capability of transmitting uncompressed data in real time, a transmission rate of 3.5 Gbps and a wide transmission band, and the like.

In the conventional information device, an interface circuit for interfacing with the outside based on the HDMI or other standards and a main processing circuit for performing signal processing related to a main function in the information device have been controlled by the same microcomputer. In a display device such as a plasma display device as an example, a receiver circuit for receiving and outputting a video signal, an audio signal and the like transmitted from a source device such as a DVD device by using a predetermined interface and a signal processing circuit for performing a format conversion process and like related to video display and audio output upon the video and audio signals outputted from the receiver circuit are controlled by the same microcomputer. Thus, the single microcomputer is required to execute firmware for controlling the interface circuit and firmware for controlling the main processing circuit, and therefore has the problem of bearing a heavy load during real-time processing. It is also necessary to develop the firmware for controlling the interface circuit and the firmware for controlling the main processing circuit in the same environment. This provides an increased development load, and becomes one of the causes of the slowdown of the development. Similar problems arise in the source device such as the DVD device.

SUMMARY OF THE INVENTION

It is therefore an object of the present invention to provide a technique for an information device including a main processing circuit, an interface circuit and a microcomputer, which is capable of speeding up the development of the information device while reducing a processing load on the microcomputer.

According to the present invention, an information device includes: a main processing circuit for executing signal processing related to a main function in the information device; a first microcomputer for controlling the main processing circuit; an interface circuit for interfacing with the outside of the information device; and a second microcomputer for controlling the interface circuit, the second microcomputer being provided separately from the first microcomputer.

The information device includes the second microcomputer for controlling the interface circuit separately from the first microcomputer for controlling the main processing circuit. Thus, firmware for controlling the interface circuit can be executed by the microcomputer different from the microcomputer which executes firmware for controlling the main processing circuit. This reduces a processing load on one microcomputer.

Additionally, the interface circuit and the second microcomputer may be implemented in the form of an IP (Intellectual Property) core. This facilitates the formation of the interface circuit and the second microcomputer together with the main processing circuit and the first microcomputer on a single semiconductor chip, and reduces the labor of the verification of circuit operation at the time of the integration of the interface circuit and the second microcomputer together with the main processing circuit and the first microcomputer.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
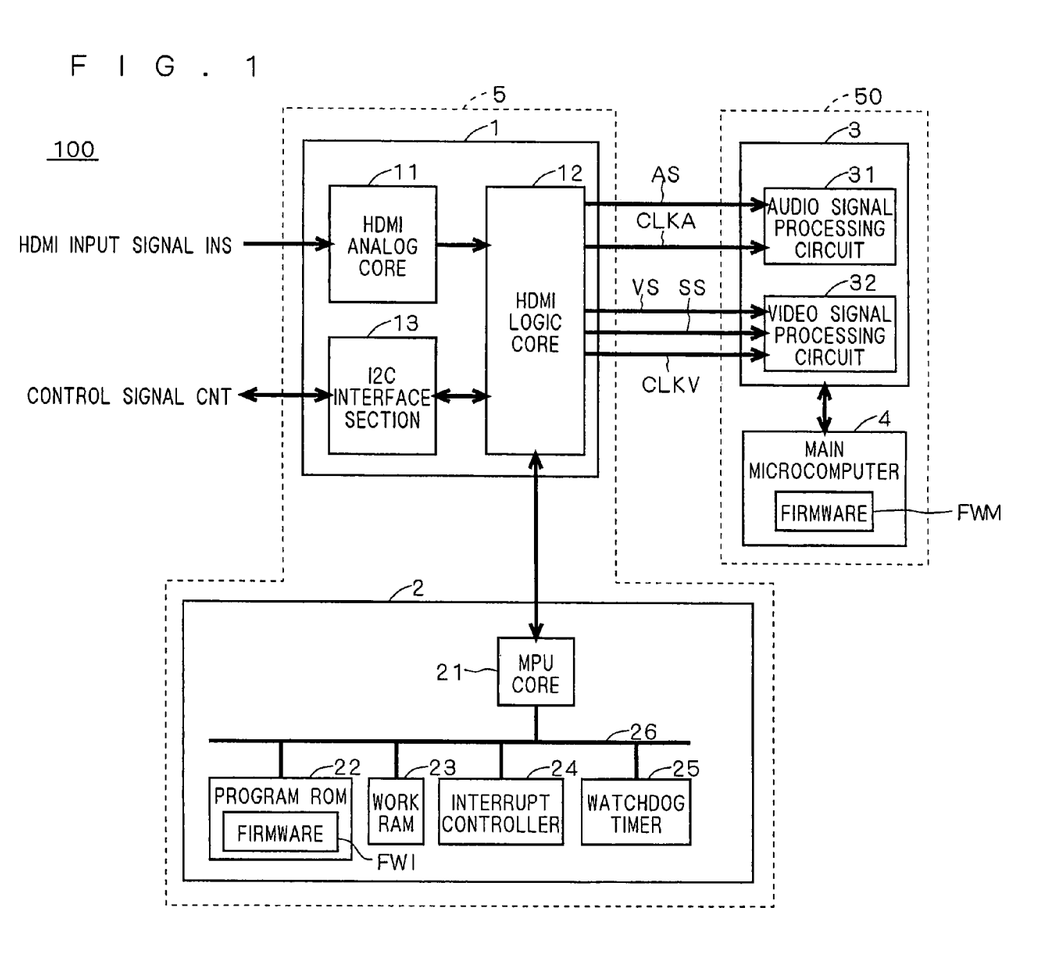
FIG. 1 is a block diagram showing the construction of an information device according to a first preferred embodiment of the present invention.

FIG. 1 is a block diagram showing the construction of an information device 100 according to a first preferred embodiment of the present invention. The information device 100 according to the first preferred embodiment is a display device such as, for example, a plasma display device and a liquid crystal display device. For example, HDMI is used as an interface between the information device 100 and the outside thereof.

As shown in FIG. 1, the information device 100 according to the first preferred embodiment includes a receiver circuit 1 for interfacing with the outside of the information device 100, an interface microcomputer 2 for controlling the receiver circuit 1, a main processing circuit 3 for performing signal processing related to a main function in the information device 100, and a main microcomputer 4 for controlling the main processing circuit 3.

The receiver circuit 1 is an interface circuit which, based on the HDMI standard, receives an HDMI input signal INS inputted from another information device (referred to hereinafter as an external device) outside the information device 100. The receiver circuit 1 includes an HDMI analog core 11, an HDMI logic core 12, and an I2C (Inter-Integrated Circuit) interface section 13.

The HDMI analog core 11 is a high-speed SERDES (serializer/de-serializer) circuit, and converts the HDMI input signal INS which is a serial signal into a parallel signal to output the parallel signal to the HDMI logic core 12. The I2C interface section 13 exchanges a control signal CNT with the external device, based on the DDC (Display Data Channel) standard. The I2C interface section 13 sends and receives the control signal CNT by using an I2C interface.

The HDMI logic core 12 is controlled by the interface microcomputer 2. The HDMI logic core 12 exchanges the control signal CNT with the external device through the I2C interface section 13 to thereby perform an authentication process, and thereafter decrypts the HDMI input signal INS which is encrypted. The HDMI input signal INS is encrypted using a digital encryption scheme known as an HDCP (High-bandwidth Digital Content Protection) system. The HDMI logic core 12 extracts a video signal VS and an audio signal AS from the decrypted HDMI input signal INS, decodes the video signal VS and the audio signal AS into a predetermined format, and generates a clock signal CLKV synchronized with the decoded video signal VS and a clock signal CLKA synchronized with the decoded audio signal AS. The HDMI logic core 12 also extracts a synchronization signal SS for video display from the decrypted HDMI input signal INS, and decodes the synchronization signal SS into a predetermined format. Thereafter, the HDMI logic core 12 outputs the video signal VS, the audio signal AS, the clock signals CLKA and CLKV, and the synchronization signal SS in parallel to the main processing circuit 3.

The interface microcomputer 2 includes an MPU (Micro Processing Unit) core 21 for controlling the HDMI logic core 12, a program ROM (Read Only Memory) 22 for storing therein firmware FWI for controlling the HDMI logic core 12, a work RAM (Random Access Memory) 23 which the MPU core 21 uses as a storage area while the MPU core 21 is in operation, an interrupt controller 24 for controlling an interrupt process in the MPU core 21, and a watchdog timer 25. The components 21 to 25 are connected to each other through an MPU bus 26.

The program ROM 22 is a ROM in which information can be electrically rewritten, such as a flash ROM. The firmware FWI in the program ROM 22 is rewritable.

The MPU core 21 is connected to the HDMI logic core 12 by using the I2C interface. The MPU core 21 reads the firmware FWI from the program ROM 22 to execute the firmware FWI, thereby controlling the operation of the HDMI logic core 12.

For example, the MPU core 21 initializes the HDMI logic core 12 or controls the HDMI logic core 12 to extract a predetermined packet signal from the HDMI input signal INS. This packet signal contains format information about the video signal VS, and the MPU core 21 outputs the packet signal to another circuit not shown in the information device 100. The watchdog timer 25 resets the MPU core 21 in cooperation with the interrupt controller 24 when the MPU core 21 runs away or when power to the information device 100 is instantaneously interrupted.

The main processing circuit 3 includes an audio signal processing circuit 31, and a video signal processing circuit 32. The information device 100 according to the first preferred embodiment is a display device which provides an audio output based on an externally inputted audio signal and produces a video display based on an externally inputted video signal. Therefore, the main functions of the information device 100 are the video display based on an external video signal and the audio output based on an external audio signal, and the main processing circuit 3 according to the first preferred embodiment performs various signal processing related to these functions.

The audio signal processing circuit 31 and the video signal processing circuit 32 operate in synchronism with the clock signal CLKA and the clock signal CLKV, respectively, which are outputted from the receiver circuit 1. The audio signal processing circuit 31 performs a filter process and the like on the audio signal AS outputted from the receiver circuit 1, converts the audio signal AS which is a digital signal into an analog signal, and outputs the analog signal to a loudspeaker not shown. The loudspeaker converts the audio signal inputted thereto into a sound to output the sound to the outside. The video signal processing circuit 32, on the other hand, converts the video signal VS outputted from the receiver circuit 1 into an RGB format or a YGbGr format. Also, the video signal processing circuit 32 performs a filter process on the video signal VS, and outputs the resultant signal together with the synchronization signal SS to a display section not shown. The display section produces a video display based on the video signal VS and the synchronization signal SS inputted thereto. Thus, at the same time that the video display is produced, the audio output corresponding to the video display is provided, whereby the information device 100 functions as, for example, a television set.

The main microcomputer 4 is similar in internal construction to the interface microcomputer 2, and stores therein firmware FWM for controlling the main processing circuit 3. The main microcomputer 4 executes the firmware FWM to thereby control the main processing circuit 3.

In the information device 100 according to the first preferred embodiment, the receiver circuit 1 and the interface microcomputer 2 are subjected to a "single-chip process" separately from the main processing circuit 3 and the main microcomputer 4. The term "single-chip process" used herein shall mean both the process of forming a plurality of circuits on a single semiconductor chip, irrespective of how the plurality of circuits are packaged, and the process of housing a plurality of circuits into a single package although the plurality of circuits are formed on different semiconductor chips. Therefore, the term "single chip" means both a single semiconductor chip, and a device including one or more semiconductor chips housed in a single package. The main processing circuit 3 and the main microcomputer 4 may or need not be subjected to the "single-chip process."

As an example according to the first preferred embodiment, the receiver circuit 1 and the interface microcomputer 2 are formed on a single semiconductor chip 5 different from another semiconductor chip 50 on which the main processing circuit 3 and the main microcomputer 4 are formed. Thus, the receiver circuit 1 and the interface microcomputer 2 are subjected to the single-chip process separately from the main processing circuit 3 and the main microcomputer 4. The semiconductor chip 5 is housed and molded in a single package not shown together with or separately from the semiconductor chip 50 on which the main processing circuit 3 and the main microcomputer 4 are formed.

The main processing circuit 3 and the main microcomputer 4 are formed on the single semiconductor chip 50 according to the first preferred embodiment. However, the main processing circuit 3 and the main microcomputer 4 may be formed on different semiconductor chips.

Figure 2:
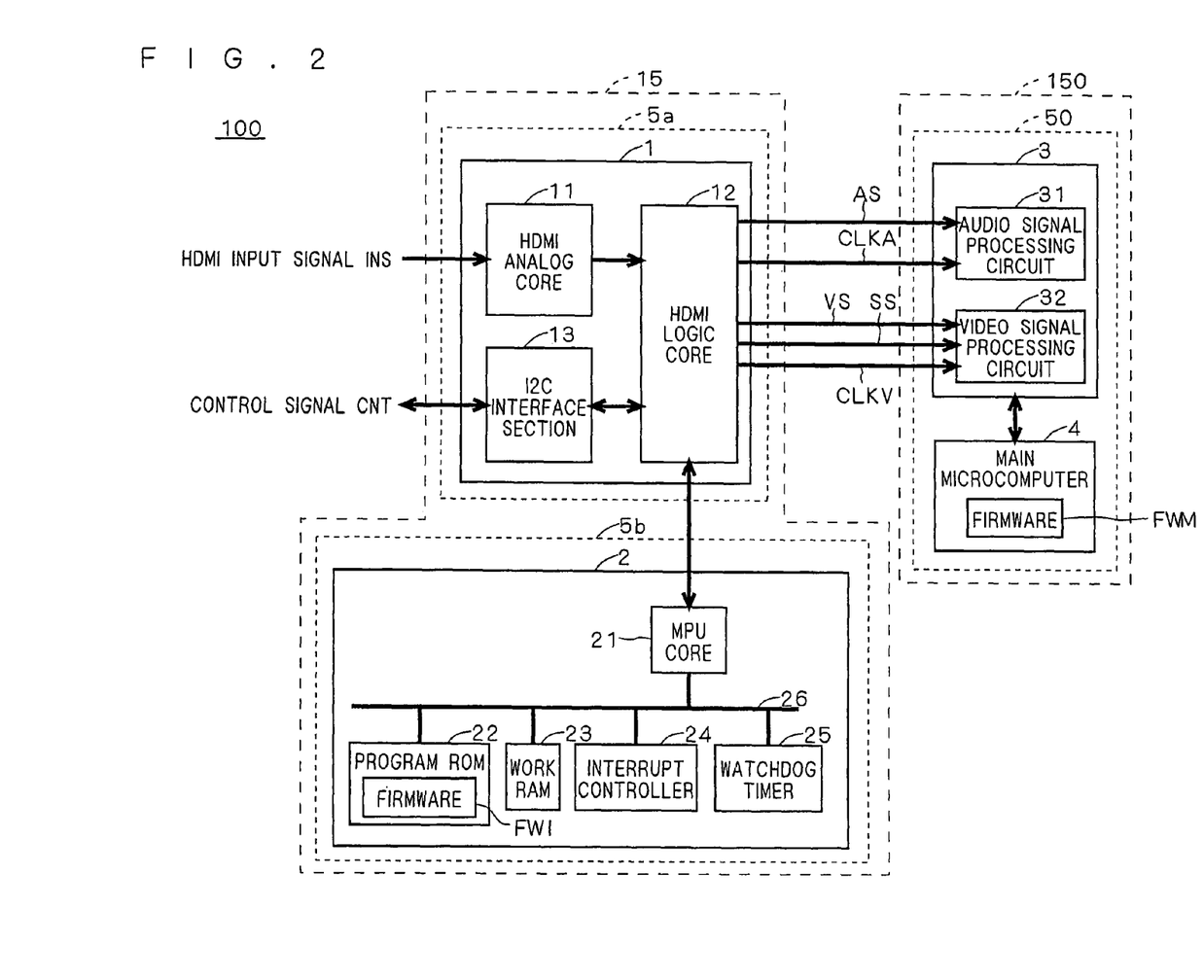
FIG. 2 is a block diagram showing the construction of a modification of the information device according to the first preferred embodiment of the present invention.

Alternatively, as shown in FIG. 2, the receiver circuit 1 is formed on a single semiconductor chip 5a whereas the interface microcomputer 2 is formed on another semiconductor chip 5b. The receiver circuit 1 and the interface microcomputer 2 are housed in a package 15 different from another package 150 in which the main processing circuit 3 and the main microcomputer 4 are housed. Thus, the receiver circuit 1 and the interface microcomputer 2 may be subjected to the single-chip process separately from the main processing circuit 3 and the main microcomputer 4.

In the instance shown in FIG. 2, the main processing circuit 3 and the main microcomputer 4 are shown as housed in the single package 150. However, the main processing circuit 3 and the main microcomputer 4, when formed on different semiconductor chips, may be housed in different packages whereas the receiver circuit 1 and the interface microcomputer 2 be housed in another package different from the above-mentioned packages.

As described above, the information device 100 according to the first preferred embodiment includes the interface microcomputer 2 for controlling the receiver circuit 1 separately from the main microcomputer 4 for controlling the main processing circuit 3. Thus, the firmware FWI for controlling the receiver circuit 1 can be executed by the microcomputer different from the microcomputer which executes the firmware FWM for controlling the main processing circuit 3. This reduces a processing load on one microcomputer.

The firmware FWI for controlling the receiver circuit 1 and the firmware FWM for controlling the main processing circuit 3, which are executed by the different microcomputers, may be developed in different environments. This allows the speedup of the development of the information device 100.

Additionally, the receiver circuit 1 and the interface microcomputer 2 may be implemented in the form of an IP (Intellectual Property) core. This facilitates the formation of the receiver circuit 1 and interface microcomputer 2 together with the main processing circuit 3 and the main microcomputer 4 on a single semiconductor chip, and reduces the labor of the verification of circuit operation at the time of the integration of the receiver circuit 1 and the interface microcomputer 2 together with the main processing circuit 3 and the main microcomputer 4.

According to the first preferred embodiment, the receiver circuit 1 and the interface microcomputer 2 are subjected to the single-chip process separately from the main processing circuit 3 and the main microcomputer 4. This improves the confidentiality of the interface between the receiver circuit 1 and the interface microcomputer 2 to increase security, and also improves the flexibility of the arrangement of the receiver circuit 1 and the interface microcomputer 2.

The receiver circuit 1 and the interface microcomputer 2 according to the first preferred embodiment are connected to each other by using the I2C interface which is a serial interface, but may be connected to each other by using a parallel interface. This reduces circuit size and power consumption.

Second Preferred Embodiment

Figure 3:
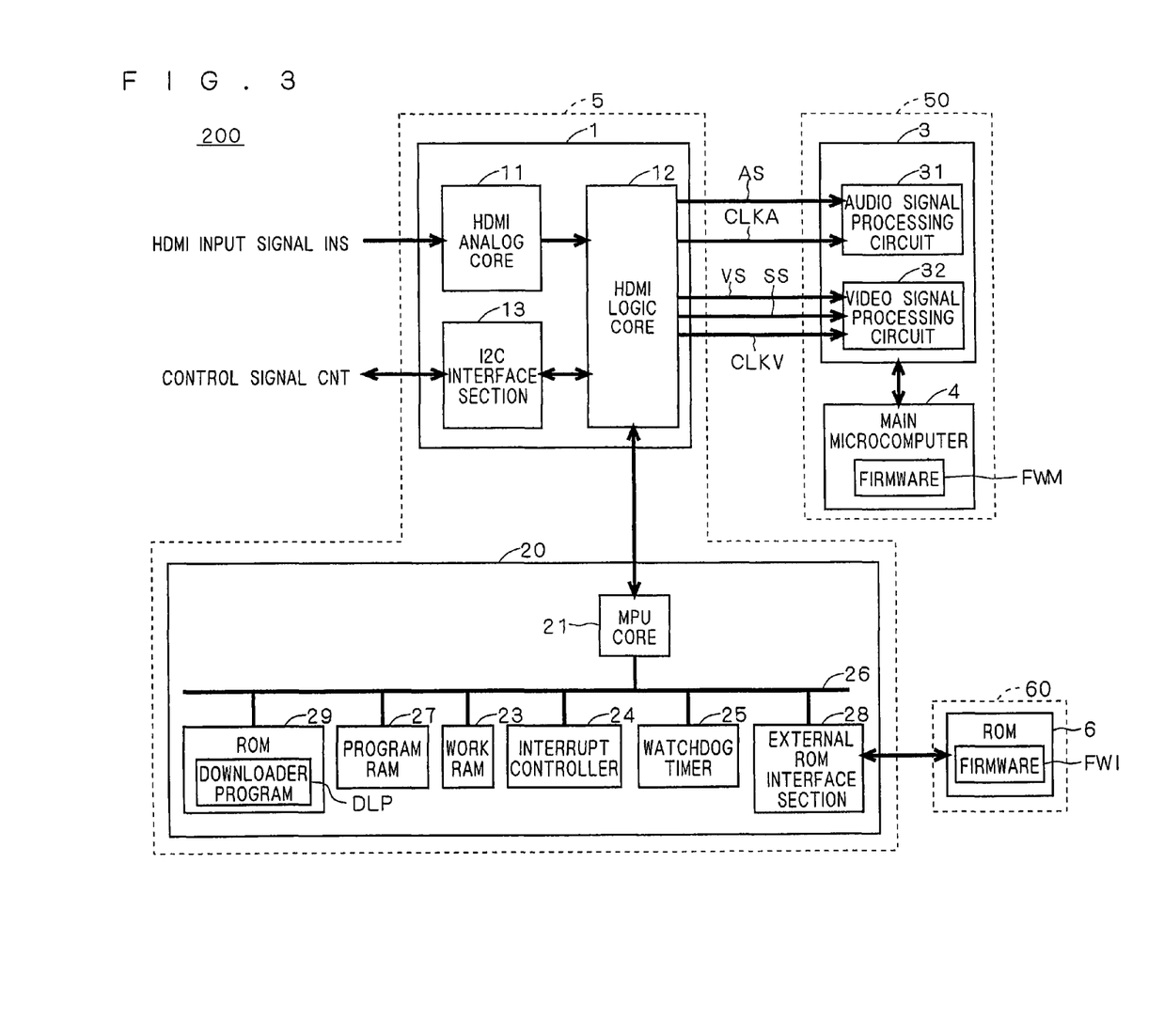
FIG. 3 is a block diagram showing the construction of an information device according to a second preferred embodiment of the present invention.

FIG. 3 is a block diagram showing the construction of an information device 200 according to a second preferred embodiment of the present invention. As shown in FIG. 3, the information device 200 according to the second preferred embodiment includes an interface microcomputer 20 in place of the interface microcomputer 2 provided in the information device 100 of the first preferred embodiment described above, and further includes a ROM 6.

The interface microcomputer 20 includes the MPU core 21, the work RAM 23, the interrupt controller 24 and the watchdog timer 25 mentioned above, and further includes a program RAM 27, an external ROM interface section 28 and a ROM 29. These components 21, 23 to 25, and 27 to 29 are connected to each other through the MPU bus 26. The interface microcomputer 20 and the receiver circuit 1 are formed on the same semiconductor chip 5, and are subjected to the single-chip process separately from the main processing circuit 3 and the main microcomputer 4, as in the first preferred embodiment.

The ROM 6 is a ROM in which information can be electrically rewritten, such as a flash ROM. The ROM 6 stores therein the firmware FWI for the interface microcomputer 20 to control the receiver circuit 1. The ROM 6 is formed on a single semiconductor chip 60 different from the semiconductor chip 5 on which the receiver circuit 1 and the interface microcomputer 20 are formed. Only the ROM 6 is formed on the semiconductor chip 60. The ROM 6 is connected to the external ROM interface section 28 of the interface microcomputer 20.

The ROM 29 in the interface microcomputer 20 is a ROM in which information cannot be electrically rewritten, such as a mask ROM. The ROM 29 previously stores a downloader program DLP therein. The MPU core 21 reads the downloader program DLP from the ROM 29 to execute the downloader program DLP, thereby reading the firmware FWI from the ROM 6 through the external ROM interface section 28 and writing the firmware FWI into the program RAM 27. Then, the MPU core 21 reads the firmware FWI from the program RAM 27 to execute the firmware FWI, thereby controlling the receiver circuit 1. The remaining structure of the information device 200 according to the second preferred embodiment is similar to that of the information device 100 according to the first preferred embodiment, and will not be described.

In the information device 200 according to the second preferred embodiment as described above, the interface microcomputer 20 downloads the firmware FWI from the ROM 6 formed on the semiconductor chip 60 different from the semiconductor chip 5 on which the interface microcomputer 20 is formed, to execute the firmware FWI. This eliminates the need to form a memory for previously storing the firmware FWI such as a flash ROM on the semiconductor chip 5 on which the interface microcomputer 20 is formed. In general, the incorporation of a memory into a microcomputer makes the manufacturing process thereof complicated to increase manufacturing costs. Therefore, the formation of the interface microcomputer 20 and the ROM 6 which stores the firmware FWI on the different semiconductor chips simplifies the manufacturing process of the interface microcomputer 20 to reduce the manufacturing costs.

Although the manufacturing process of the interface microcomputer 20 becomes complicated, the ROM 6 may be incorporated into the interface microcomputer 20 and be formed on the semiconductor chip 5.

Third Preferred Embodiment

Figure 4:
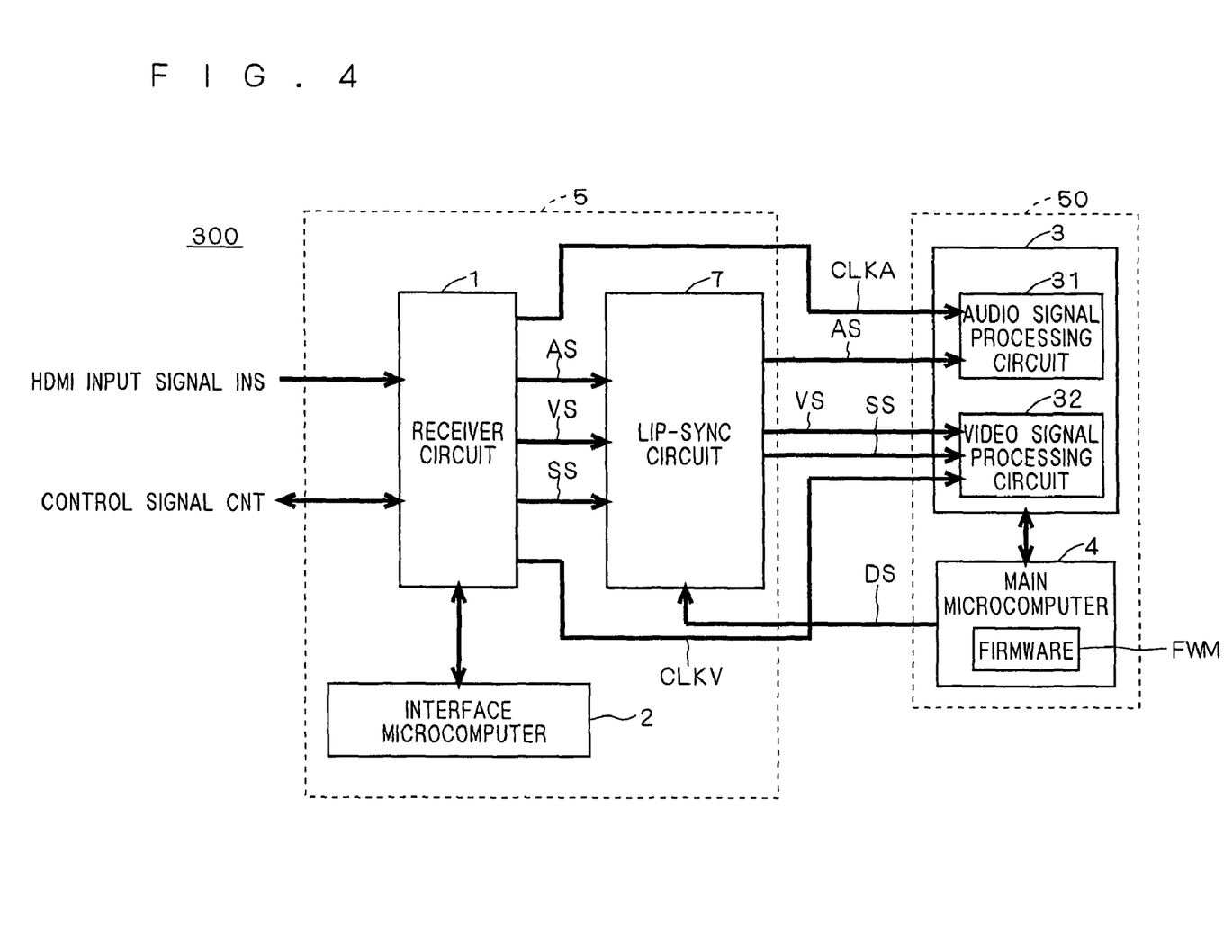
FIG. 4 is a block diagram showing the construction of an information device according to a third preferred embodiment of the present invention.

FIG. 4 is a block diagram showing the construction of an information device 300 according to a third preferred embodiment of the present invention. As shown in FIG. 4, the information device 300 according to the third preferred embodiment principally includes a lip-sync circuit 7 for adjusting the timing between the audio signal AS and the video signal VS in addition to the components of the information device 100 of the first preferred embodiment mentioned above.

The main microcomputer 4 according to the third preferred embodiment measures a time lag between the time at which the audio signal AS is outputted from the audio signal processing circuit 31 and the time at which the video signal VS corresponding to the audio signal AS is outputted from the video signal processing circuit 32, and generates a delay amount instruction signal DS based on the time lag to output the delay amount instruction signal DS to the lip-sync circuit 7. Based on the delay amount instruction signal DS inputted thereto, the lip-sync circuit 7 delays at least one of the audio signal AS and the video signal VS which are outputted in parallel from the receiver circuit 1 to output the processed audio and video signals AS and VS to the audio signal processing circuit 31 and the video signal processing circuit 32, respectively. When delaying the video signal VS, the lip-sync circuit 7 accordingly delays the synchronization signal SS, and then outputs the synchronization signal SS. This corrects the time lag between the audio signal AS and the video signal VS at outputs of the main processing circuit 3 to ensure the synchronization between the audio signal AS and the video signal VS. Consequently, the time lag between the video display and the corresponding audio output is suppressed. It should be noted that the clock signals CLKA and CLKV outputted from the receiver circuit 1 do not pass through the lip-sync circuit 7 but are directly inputted to the audio signal processing circuit 31 and video signal processing circuit 32, respectively.

The lip-sync circuit 7 is subjected to the single-chip process together with the receiver circuit 1 and the interface microcomputer 2. As an example according to the third preferred embodiment, the lip-sync circuit 7 is formed on the single semiconductor chip 5 together with the receiver circuit 1 and the interface microcomputer 2, whereby the lip-sync circuit 7 is subjected to the single-chip process together with the receiver circuit 1 and the interface microcomputer 2. The remaining structure of the information device 300 according to the third preferred embodiment is similar to that of the information device 100 according to the first preferred embodiment, and will not be described.

In the information device 300 according to the third preferred embodiment as described above, the lip-sync circuit 7 for adjusting the timing between the audio signal AS and the corresponding video signal VS which are outputted in parallel from the receiver circuit 1 is subjected to the single-chip process together with the receiver circuit 1 and the interface microcomputer 2. Thus, the time lag between the audio signal AS and the video signal VS is corrected by using a single-chip device. This consequently suppresses the time lag between the video display and the corresponding audio output.

Fourth Preferred Embodiment

Figure 5:
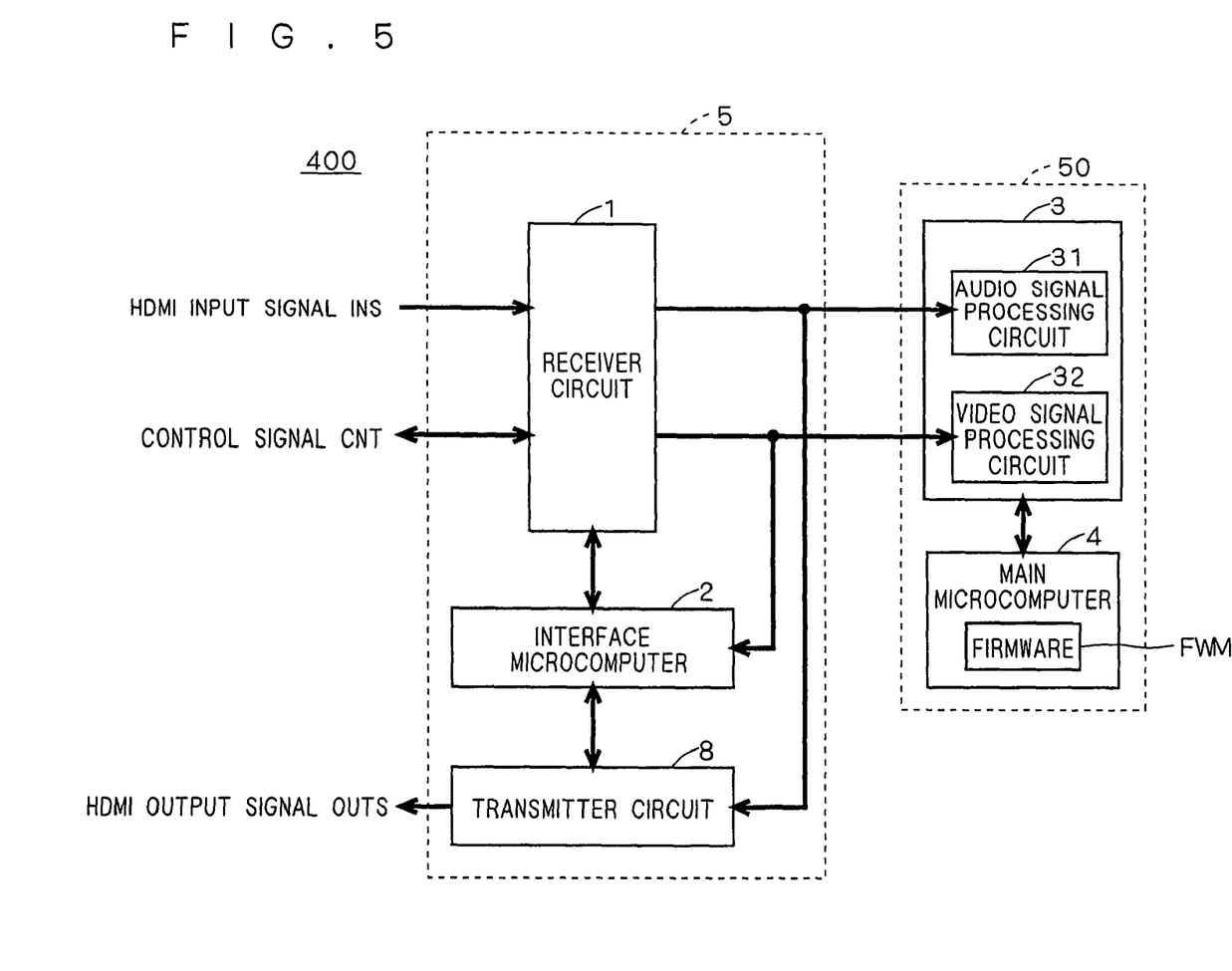
FIG. 5 is a block diagram showing the construction of an information device according to a fourth preferred embodiment of the present invention.

FIG. 5 is a block diagram showing the construction of an information device 400 according to a fourth preferred embodiment of the present invention. As shown in FIG. 5, the information device 400 according to the fourth preferred embodiment principally includes a transmitter circuit 8 in addition to the components of the information device 100 of the first preferred embodiment described above.

The transmitter circuit 8 is controlled by the interface microcomputer 2 to operate. The transmitter circuit 8 encodes the audio signal AS, the video signal VS and the synchronization signal SS which are outputted in parallel from the receiver circuit 1 into a predetermined format, and thereafter rearranges the audio signal AS, the video signal VS and the synchronization signal SS which are inputted thereto in parallel into serial chronological order. Then, the transmitter circuit 8 encrypts the resultant signal by using the HDCP system, converts the encrypted signal into a serial signal, and outputs the serial signal as an, HDMI output signal OUTS to the external device. Thus, the HDMI input signal INS inputted to the information device 400 is relayed by the receiver circuit 1 and the transmitter circuit 8, and is then outputted as the HDMI output signal OUTS to the outside of the information device 400.

The transmitter circuit 8 is subjected to the single-chip process together with the receiver circuit 1 and the interface microcomputer 2. As an example according to the fourth preferred embodiment, the transmitter circuit 8 is formed on the single semiconductor chip 5 together with the receiver circuit 1 and the interface microcomputer 2, whereby the transmitter circuit 8 is subjected to the single-chip process together with the receiver circuit 1 and the interface microcomputer 2. The remaining structure of the information device 400 according to the fourth preferred embodiment is similar to that of the information device 100 according to the first preferred embodiment, and will not be described.

In the information device 400 according to the fourth preferred embodiment as described above, the receiver circuit 1 which receives and outputs the externally inputted signal and the transmitter circuit 8 which outputs the signal outputted from the receiver circuit 1 to the outside are subjected to the single-chip process. Thus, a repeater function for relaying an external signal to output the external signal is implemented by a single-chip device.

Fifth Preferred Embodiment

Figure 6:
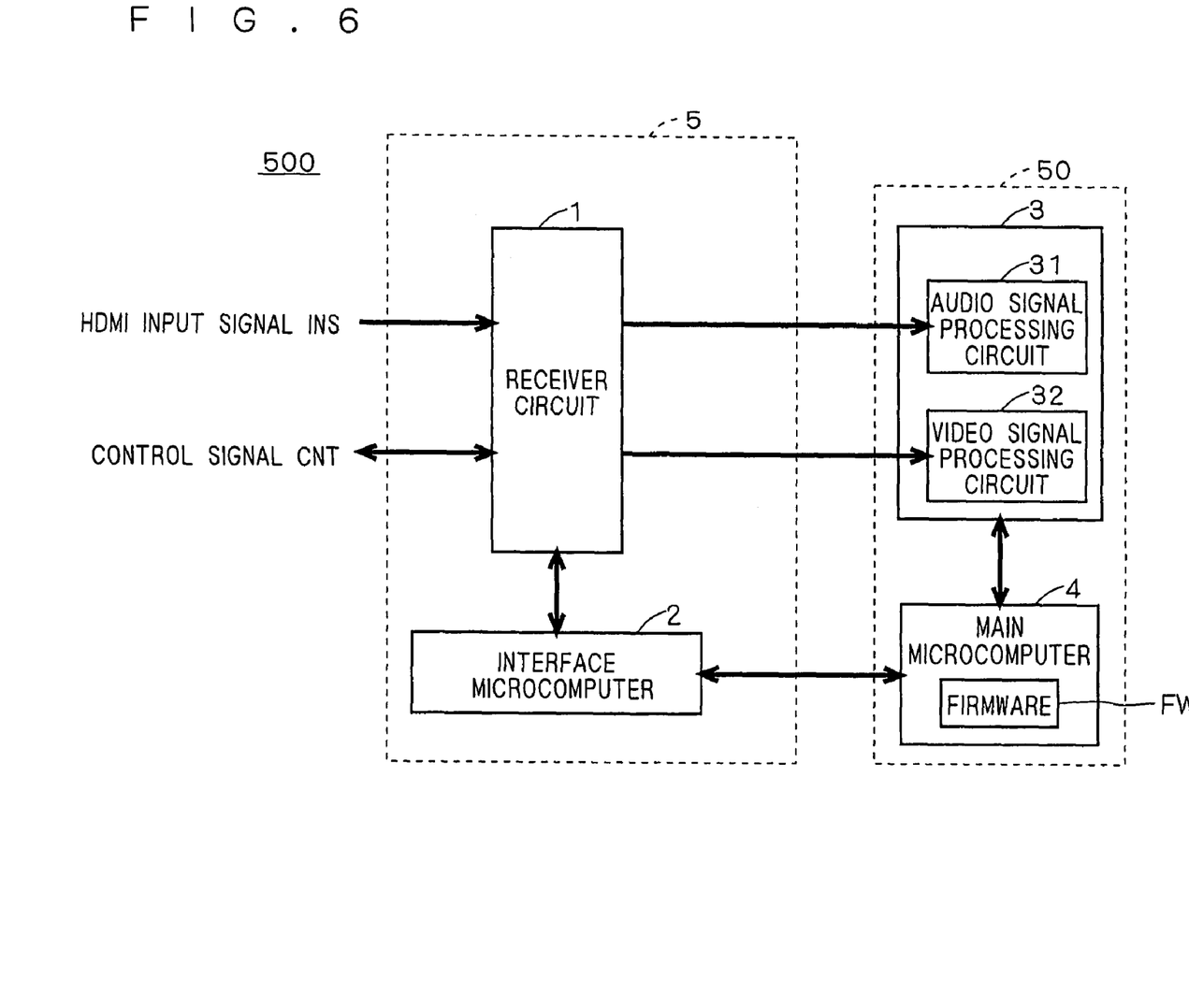
FIG. 6 is a block diagram showing the construction of an information device according to a fifth preferred embodiment of the present invention.

FIG. 6 is a block diagram showing the construction of an information device 500 according to a fifth preferred embodiment of the present invention. As shown in FIG. 6, the information device 500 according to the fifth preferred embodiment is such that the function of communicating with the main microcomputer 4 is implemented in the interface microcomputer 2 of the information device 100 of the first preferred embodiment mentioned above. The interface microcomputer 2 and the main microcomputer 4 are connected to each other by using, for example, the I2C interface, to be able to exchange signals with each other. The remaining structure of the information device 500 according to the fifth preferred embodiment is similar to that of the information device 100 according to the first preferred embodiment, and will not be described.

In the information device 500 according to the fifth preferred embodiment as described above, the interface microcomputer 2 has the function of communicating with the main microcomputer 4. This enables the interface microcomputer 2 to be controlled from the main microcomputer 4 in accordance with the operating conditions of the main processing circuit 3. For example, the main microcomputer 4 can reset the interface microcomputer 2 to initialize the operation of the interface microcomputer 2 when a cable for connection between the information device 500 and the external device is accidentally disconnected so that neither the audio signal AS nor the video signal VS is inputted to the main processing circuit 3 or when the audio signal AS and the video signal VS are not normally inputted from the receiver circuit 1 to the main processing circuit 3.

The function of communicating with the main microcomputer 4 may be implemented in the interface microcomputer 2 of the information device 300 of the third preferred embodiment mentioned above. This enables the interface microcomputer 2 to receive the delay amount instruction signal DS outputted from the main microcomputer 4 and to output the delay amount instruction signal DS to the lip-sync circuit 7.

Sixth Preferred Embodiment

Figure 7:
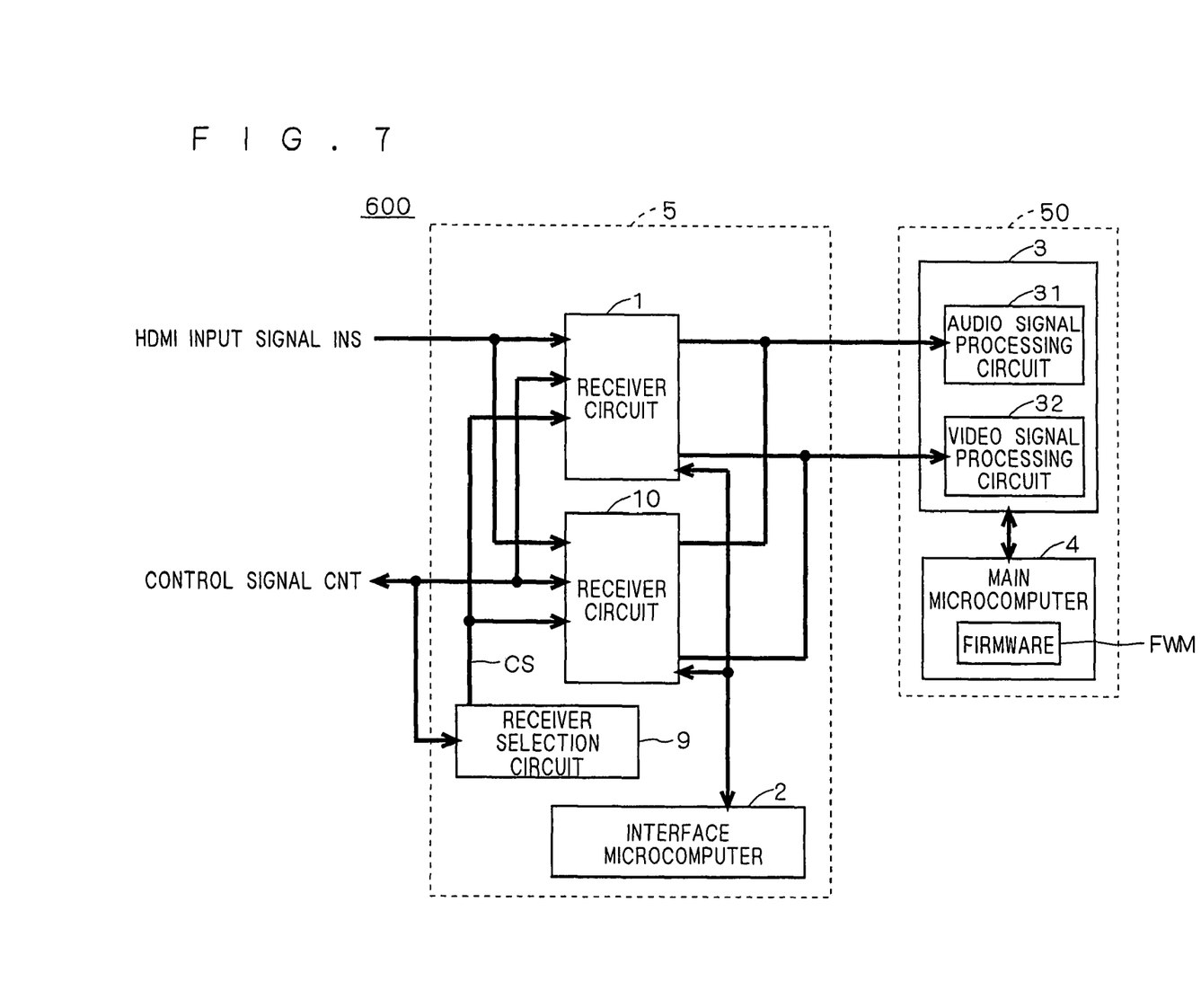
FIG. 7 is a block diagram showing the construction of an information device according to a sixth preferred embodiment of the present invention.

FIG. 7 is a block diagram showing the construction of an information device 600 according to a sixth preferred embodiment of the present invention. As shown in FIG. 7, the information device 600 according to the sixth preferred embodiment principally includes a receiver circuit 10 and a receiver selection circuit 9 in addition to the components of the information device 100 of the first preferred embodiment described above.

The receiver circuit 10 has a circuit configuration similar to that of the receiver circuit 1 according to the first preferred embodiment, and interfaces with the outside of the information device 600. Like the receiver circuit 1, the receiver circuit 10 is controlled by the interface microcomputer 2 to receive the HDMI input signal INS from the external device and to exchange the control signal CNT with the external device. However, the receiver circuit 10 conforms to a different version of the HDMI standard than that of the receiver circuit 1. For example, the receiver circuit 10 interfaces with the external device in conformity with the HDMI version 1.2, whereas the receiver circuit 1 interfaces with the external device in conformity with the HDMI version 1.1. A bus connection is established between an output terminal of the receiver circuit 10 and an output terminal of the receiver circuit 1.

The control signal CNT according to the sixth preferred embodiment contains information about which HDMI version the HDMI input signal INS outputted from the external device conforms to. The receiver selection circuit 9 refers to the information contained in the control signal CNT to recognize the HDMI version to which the HDMI input signal INS conforms, thereby outputting a chip select signal CS to the receiver circuits 1 and 10, based on the recognized version. This activates one of the receiver circuits 1 and 10 which conforms to the version of the HDMI input signal INS. The interface microcomputer 2 receives activation information from the receiver selection circuit 9 to recognize the activated receiver circuit based on the activation information, thereby controlling the operation of the activated receiver circuit.

Under the control of the interface microcomputer 2, the receiver circuit activated in this manner by the receiver selection circuit 9 performs the serial-to-parallel conversion process, the decryption process and the like on the HDMI input signal INS to extract the audio signal AS, the video signal VS and the synchronization signal SS from the HDMI input signal INS, thereby outputting these signals and the clock signals CLKA and CLKV in parallel to the main processing circuit 3. On the other hand, the output terminal of the receiver circuit which is not activated by the receiver selection circuit 9 is placed in a high impedance state. Thus, the audio signal AS, the video signal VS and the like from the activated receiver circuit are normally inputted to the main processing circuit 3.

The receiver selection circuit 9 and the receiver circuit 10 are subjected to the single-chip process together with the receiver circuit 1 and the interface microcomputer 2. As an example according to the sixth preferred embodiment, the receiver selection circuit 9 and the receiver circuit 10 are formed on the single semiconductor chip 5 together with the receiver circuit 1 and the interface microcomputer 2, whereby the receiver selection circuit 9 and the receiver circuit 10 are subjected to the single-chip process together with the receiver circuit 1 and the interface microcomputer 2. The remaining structure of the information device 600 according to the sixth preferred embodiment is similar to that of the information device 100 according to the first preferred embodiment, and will not be described.

The information device 600 according to the sixth preferred embodiment as described above includes the receiver circuits 1 and 10 which interface with the external device under different specifications. One of the receiver circuits 1 and 10 is activated by the receiver selection circuit 9 in accordance with the specifications of the HDMI input signal INS provided from the outside. The receiver selection circuit 9 and the receiver circuit 10 are subjected to the single-chip process together with the receiver circuit 1 and the interface microcomputer 2. Thus, a single-chip device can receive a plurality of external signals different in specifications from each other.

Seventh Preferred Embodiment

Figure 8:
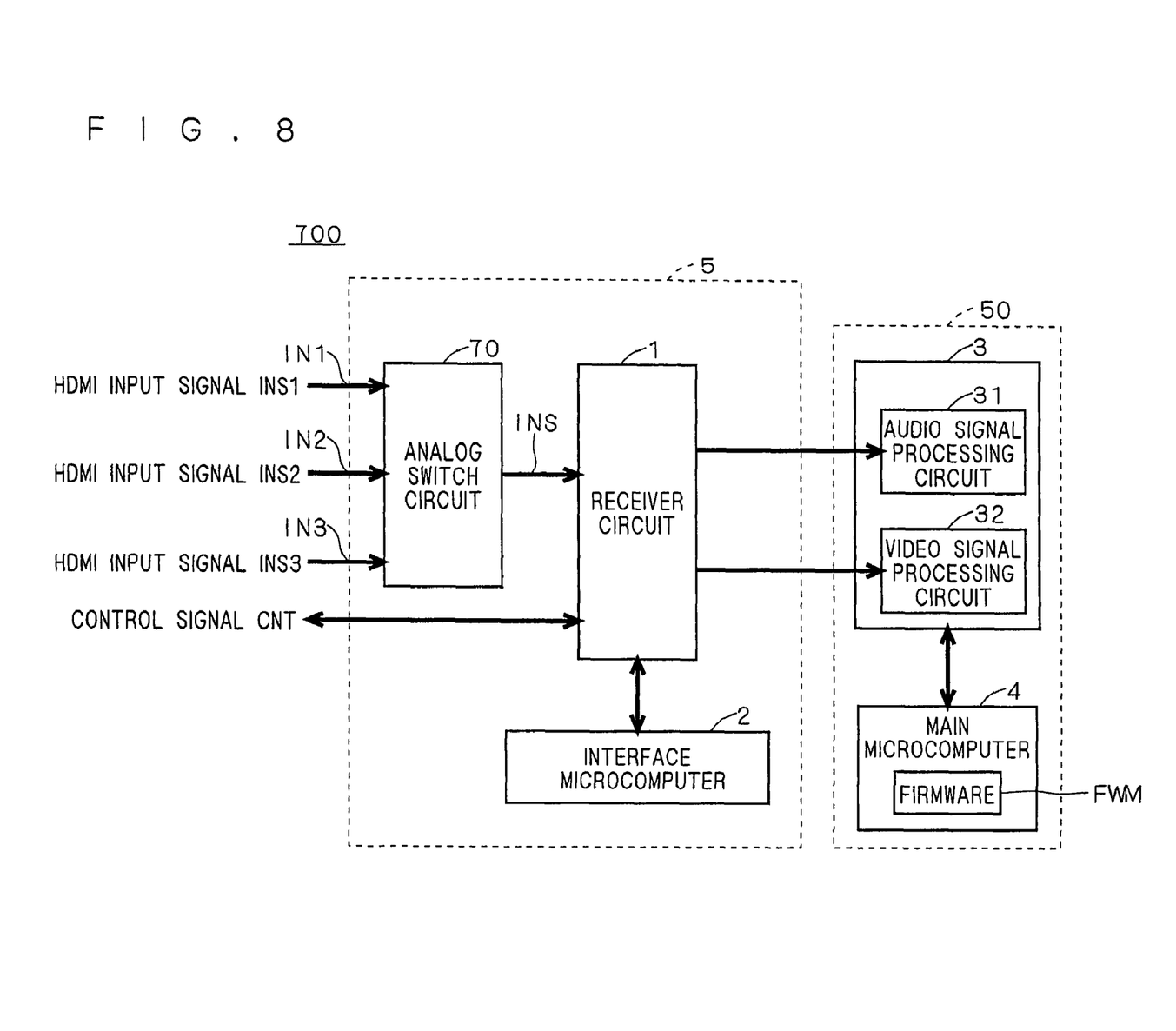
FIG. 8 is a block diagram showing the construction of an information device according to a seventh preferred embodiment of the present invention.

FIG. 8 is a block diagram showing the construction of an information device 700 according to a seventh preferred embodiment of the present invention. As shown in FIG. 8, the information device 700 according to the seventh preferred embodiment principally includes a plurality of input ports IN1 to 1N3 and an analog switch circuit 70 in addition to the components of the information device 100 of the first preferred embodiment described above.

The analog switch circuit 70 is controlled by the main microcomputer 4 to select one of a plurality of HDMI input signals INS1 to INS3 inputted to the plurality of input ports IN1 to IN3 respectively, thereby outputting the selected signal as the HDMI input signal INS to the receiver circuit 1.

The information device 700 according to the seventh preferred embodiment is constructed to enable a user to enter information indicating which one of the plurality of input ports IN1 to 1N3 receives the HDMI input signal to be processed. The information entered by the user is inputted to the main microcomputer 4. Then, the main microcomputer 4 controls the analog switch circuit 70 based on the information inputted thereto. Thus, the information device 700 processes the HDMI input signal inputted to the port specified by the user to display an image transmitted by the HDMI input signal and to output a sound transmitted by the HDMI input signal.

The analog switch circuit 70 is subjected to the single-chip process together with the receiver circuit 1 and the interface microcomputer 2. As an example according to the seventh preferred embodiment, the analog switch circuit 70 is formed on the single semiconductor chip 5 together with the receiver circuit 1 and the interface microcomputer 2, whereby the analog switch circuit 70 is subjected to the single-chip process together with the receiver circuit 1 and the interface microcomputer 2. The remaining structure of the information device 700 according to the seventh preferred embodiment is similar to that of the information device 100 according to the first preferred embodiment, and will not be described.

In the information device 700 according to the seventh preferred embodiment as described above, the analog switch circuit 70 for selecting one of the plurality of HDMI input signals INS1 to INS3 to output the selected HDMI input signal to the receiver circuit 1 is subjected to the single-chip process together with the receiver circuit 1 and the interface microcomputer 2. Thus, a single-chip device can process the signals inputted to the plurality of input ports IN1 to IN3. Additionally, because the single receiver circuit 1 can process the signals inputted to the plurality of input ports IN1 to IN3, the seventh preferred embodiment can construct the information device having the plurality of input ports while preventing the significant increase in chip size and suppressing the increase in cost.

Eighth Preferred Embodiment

Figure 9:
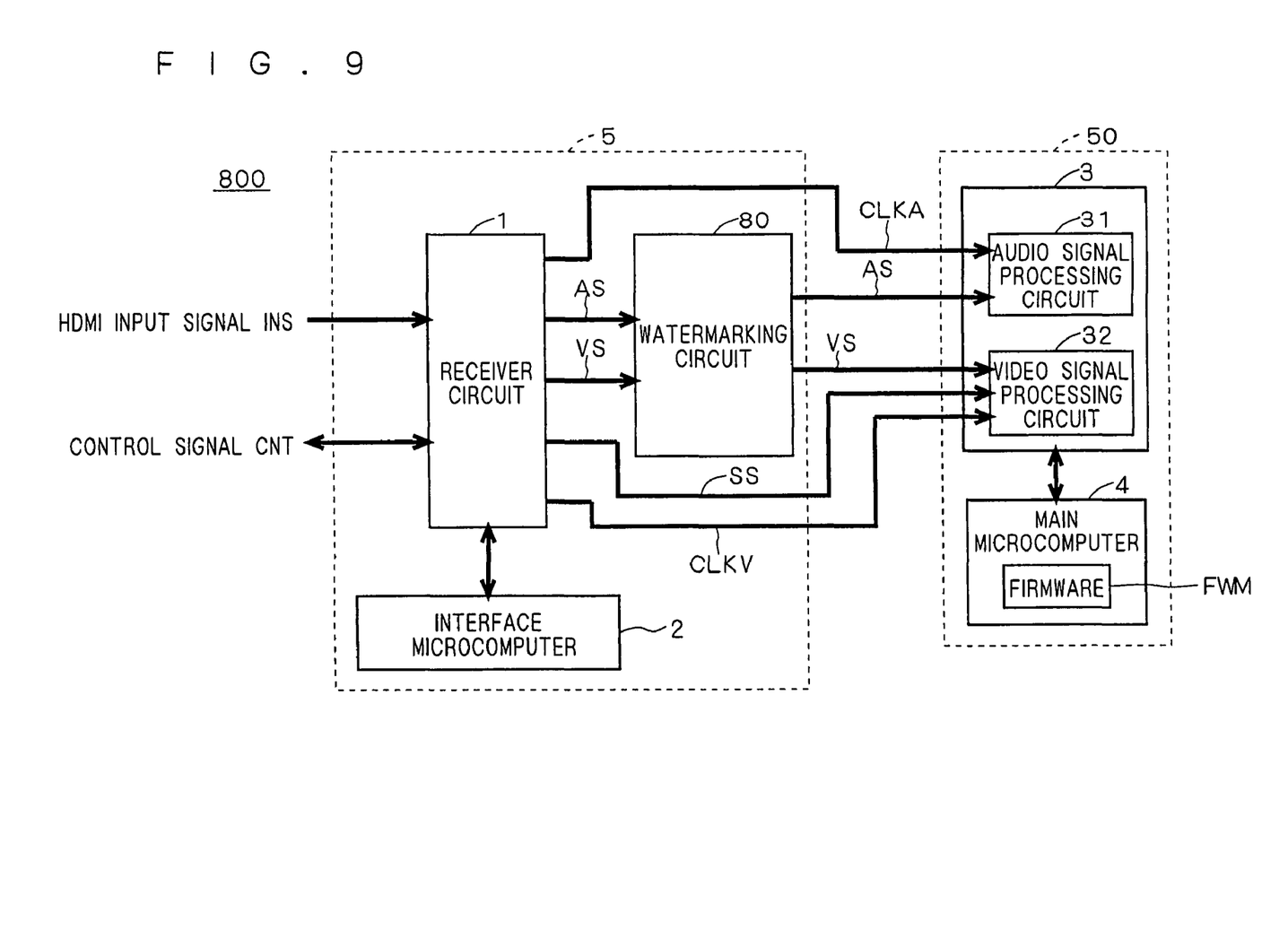
FIG. 9 is a block diagram showing the construction of an information device according to an eighth preferred embodiment of the present invention.

FIG. 9 is a block diagram showing the construction of an information device 800 according to an eighth preferred embodiment of the present invention. As shown in FIG. 9, the information device 800 according to the eighth preferred embodiment principally includes a watermarking circuit 80 in addition to the components of the information device 100 of the first preferred embodiment described above.

The watermarking circuit 80 embeds a watermark (a digital watermark or an electronic watermark) into each of the audio signal AS and the video signal VS outputted from the receiver circuit 1 to output the audio signal AS and the video signal VS to the main processing circuit 3. The audio signal processing circuit 31 of the main processing circuit 3 extracts the watermark from the audio signal AS inputted thereto, and then processes the audio signal AS as mentioned above. Similarly, the video signal processing circuit 32 extracts the watermark from the video signal VS, and then processes the video signal VS as mentioned above. The clock signals CLKA and CLKV and the synchronization signal SS are inputted from the receiver circuit 1 directly to the main processing circuit 3.

The watermarking circuit 80 is subjected to the single-chip process together with the receiver circuit 1 and the interface microcomputer 2. As an example according to the eighth preferred embodiment, the watermarking circuit 80 is formed on the single semiconductor chip 5 together with the receiver circuit 1 and the interface microcomputer 2, whereby the watermarking circuit 80 is subjected to the single-chip process together with the receiver circuit 1 and the interface microcomputer 2. The remaining structure of the information device 800 according to the eighth preferred embodiment is similar to that of the information device 100 according to the first preferred embodiment, and will not be described.

In the information devices according to the first to seventh preferred embodiments mentioned above, the uncoded audio and video signals AS and VS which are subjected to the decryption are inputted from the receiver circuit 1 to the main processing circuit 3. Because information about the image and sound transmitted from the external device is easily acquired in the path between the receiver circuit 1 and the main processing circuit 3, it is desirable to augment security.

In the information device 800 according to the eighth preferred embodiment, the watermark is embedded into the audio signal AS and the video signal VS which are subjected to the decryption by the watermarking circuit 80 subjected to the single-chip process together with the receiver circuit 1 and the interface microcomputer 2, and the audio signal AS and the video signal VS are thereafter inputted to the main processing circuit 3. This makes the leakage of the information about the image and the sound more difficult, to increase the security.

The information devices according to the first to eighth preferred embodiments adopt the HDMI as the interface with the outside, but may adopt other standards than the HDMI standard.

Figure 10:
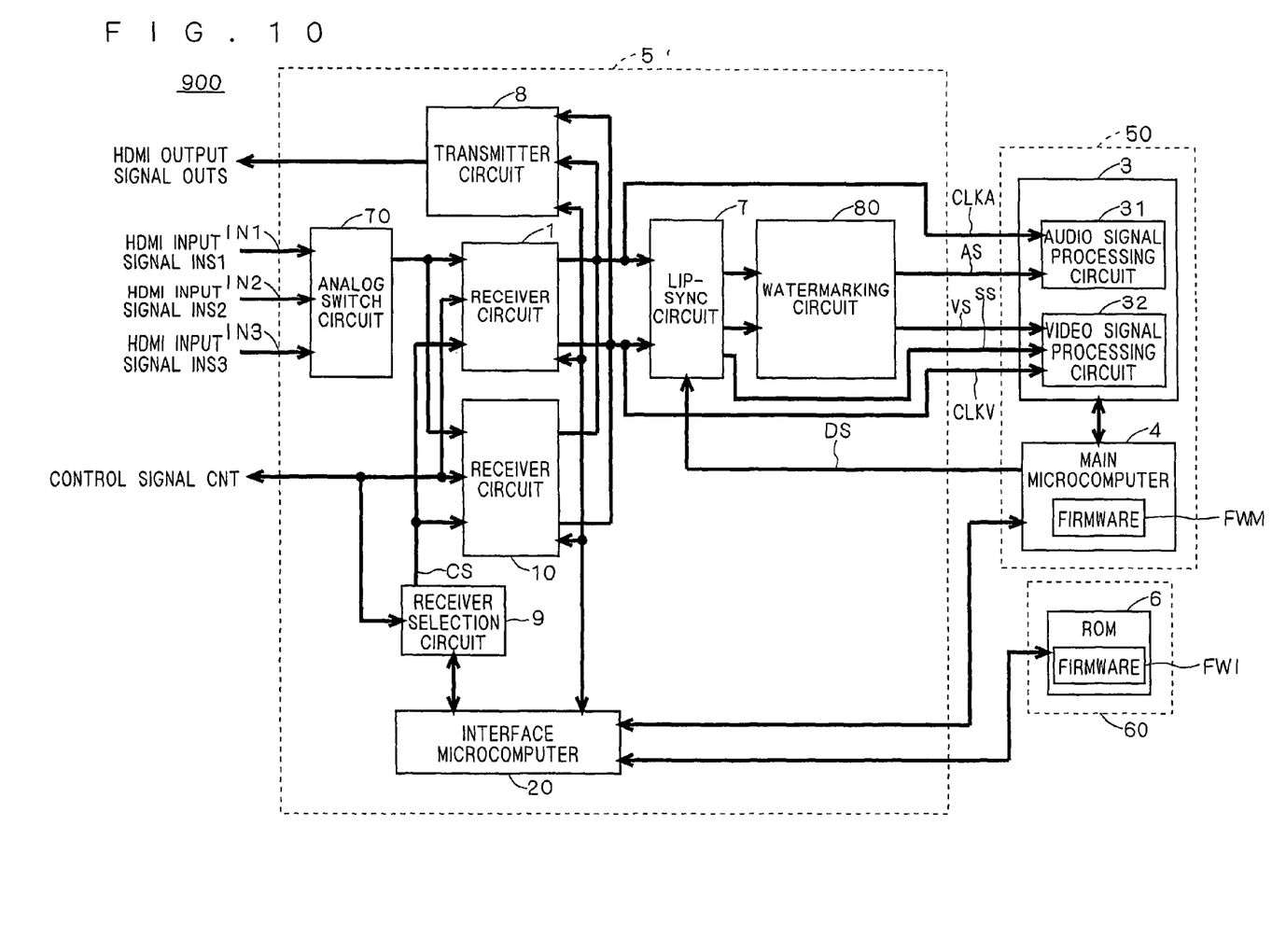
FIG. 10 is a block diagram showing the construction of an information device including all of the functions of the information devices according to the second to eighth preferred embodiments of the present invention.

As shown in FIG. 10, an information device 900 having all of the functions of the information devices according to the second to eighth preferred embodiments mentioned above may be provided by adding the lip-sync circuit 7, the transmitter circuit 8, the receiver selection circuit 9, the receiver circuit 10, the plurality of input ports IN1 to IN3, the analog switch circuit 70 and the watermarking circuit 80 mentioned above to the information device 200 according to the second preferred embodiment mentioned above and by implementing the function of communicating with the main microcomputer 4 in the interface microcomputer 2.

While the invention has been described in detail, the foregoing description is in all aspects illustrative and not restrictive. It is understood that numerous other modifications and variations can be devised without departing from the scope of the invention.

What is claimed is:

1. An information device packaged in one package, comprising:
   a main function unit including a main processing circuit for executing signal processing related to a main function in said information device and a first microcomputer for controlling said main processing circuit by executing a first firmware program; and
   an interface function unit including a first interface circuit for receiving data from an exterior device located outside of said information device to provide to said main function unit, a second interface circuit for performing an authentication operation with the exterior device, a second microcomputer for controlling said first interface circuit, and a memory for storing a second firmware program for controlling said first interface circuit,
   wherein said second microcomputer downloads said second firmware from said memory by executing a download program, and controlling said authentication operation of said second interface circuit,
   wherein said interface function unit is subjected to a single-chip process separately from said main function unit,
   wherein said first interface circuit and said second microcomputer are connected to each other by using a parallel interface, and
   wherein said first interface circuit is an interface circuit conforming to HDMI (High-Definition Multimedia Interface).

2. The information device according to claim 1,
   wherein said first interface circuit receives an externally input video signal and an externally input audio signal corresponding to said video signal to output said video signal and said audio signal in parallel, said information device further comprising a lip-sync circuit for adjusting the timing between said video signal and said audio signal output in parallel from said first interface circuit, said lip-sync circuit being subjected to the single-chip process together with said first interface circuit and said second microcomputer.

3. The information device according to claim 1, wherein said first interface circuit includes a receiver circuit for receiving an external signal to output said external signal, and a transmitter circuit for outputting a signal output from said receiver circuit to the outside of said information device.

4. The information device according to claim 1, wherein said second microcomputer has the function of communicating with said first microcomputer.

5. The information device according to claim 1, further comprising:
a plurality of input ports for receiving respective external signals; and
a switch circuit for selecting one of the external signals input to said plurality of input ports to output a selected signal to said first interface circuit, said switch circuit being subjected to the single-chip process together with said first interface circuit and said second microcomputer.

6. The information device according to claim 1, wherein said first interface circuit receives an encrypted signal input from the outside of said information device, decrypts said encrypted signal, and outputs the decrypted signal, said information device further comprising a watermarking circuit for embedding a watermark into a signal output from said first interface circuit to output the resultant signal, said watermarking circuit being subjected to the single-chip process together with said first interface circuit and said second microcomputer.

* * * * *